(12) United States Patent
Six et al.

(10) Patent No.: US 8,620,279 B2
(45) Date of Patent: Dec. 31, 2013

(54) APPARATUS AND METHOD FOR SENDING VIDEO CONTENT TO A MOBILE DEVICE

(75) Inventors: Scirocco Michelle Six, Sunnyvale, CA (US); Sterling Mace, San Francisco, CA (US); Stephen Mui, Santa Clara, CA (US); Jason Fisher, San Francisco, CA (US)

(73) Assignee: Open Invention Network, LLC, Durham, NC (US)

( * ) Notice: Subject to any disclaimer, the term of this patent is extended or adjusted under 35 U.S.C. 154(b) by 768 days.

(21) Appl. No.: 12/048,143

(22) Filed: Mar. 13, 2008

(65) Prior Publication Data

US 2008/0227435 A1 Sep. 18, 2008

Related U.S. Application Data

(60) Provisional application No. 60/894,500, filed on Mar. 13, 2007.

(51) Int. Cl.
*H04M 3/42* (2006.01)
(52) U.S. Cl.
USPC ........................................ 455/414.1; 370/338
(58) Field of Classification Search
USPC ............................ 455/414.1; 348/14.01–14.07
See application file for complete search history.

(56) References Cited

U.S. PATENT DOCUMENTS

| 2005/0044042 | A1 | 2/2005 | Mendiola et al. |
| 2005/0071477 | A1* | 3/2005 | Evans et al. ................... 709/228 |
| 2006/0031387 | A1 | 2/2006 | Hamzeh et al. |
| 2007/0050445 | A1* | 3/2007 | Hyndman ..................... 709/203 |
| 2007/0252891 | A1* | 11/2007 | Gurley ....................... 348/14.01 |
| 2008/0004079 | A1* | 1/2008 | Macaluso ...................... 455/564 |
| 2008/0201201 | A1* | 8/2008 | Pousti et al. .................... 705/10 |
| 2008/0235360 | A1* | 9/2008 | Li et al. ........................ 709/223 |

OTHER PUBLICATIONS

PCT US2008/056909, MyWaves, Inc.—PCT Search Report and Written Opinion, Jun. 25, 2008.

\* cited by examiner

*Primary Examiner* — Marcos Batista
(74) *Attorney, Agent, or Firm* — Haynes and Boone, LLP

(57) ABSTRACT

An apparatus and method for sending video content to a mobile device is described. According to one embodiment, a computer-implemented method comprising embedding a widget in a website, the widget generating a form. The form is provided when a user visits the website so as to execute the widget. The form includes a first field to enter a recipient phone number, a send selector, and one or more non-visible fields, the non-visible fields containing a content service provider identifier, and a video URL. A data packet is generated with the widget when the user selects the send selector, the data packet including the recipient phone number, the video URL, and the content service provider identifier. An encoded version of the data packet is sent to the content service provider and a video link message is sent to the recipient phone number.

16 Claims, 4 Drawing Sheets

— 300

From: signup@aaa.com

Subject: Welcome to AAA's STM service

Message: Congratulations! Your temporary password is '1234'. Enter it at aaa.com, or just reply to this message.

Message 301

From: chanX4081234567@aaa.com

Subject: Welcome to the STM service

Message: Save this address and name it Library. Send in clips and organize them into channels later.

Message 302

From: service@aaa.com

Subject: Download 'My Family'

Message: Thanks for joining AAA's STM service. Click to download 'My Family' to your phone.

Message 303

Figure 3

APPARATUS AND METHOD FOR SENDING VIDEO CONTENT TO A MOBILE DEVICE

The present application claims the benefit of and priority to U.S. Provisional Patent Application No. 60/894,500 filed on Mar. 13, 2007, and is hereby, incorporated by reference.

FIELD

The field of the invention relates generally to computer systems and more particularly relates to an apparatus and method for sending video content to a mobile device.

BACKGROUND

Wireless mobile phones became so popular that more than 80 percent of Americans subscribe to at least one type of wireless service. Mobile phones are compact in size but powerful in features and functions. For example, most mobile phones are equipped with a digital camera and the users can easily take a snap shot or video without needing to carry a separate camera.

As picture-taking with mobile phones gains popularity along with the development of Internet technology, mobile users can easily store, access, maintain and share their digital pictures on a Web site from their mobile phones. However, the software running on a mobile user's phone may not be adequate for Internet access or may only support specific multimedia formats for viewing on the mobile phone. The default browser available on mobile phones varies with the mobile phone manufacturer and the mobile service carrier. To make it worse, those mobile phones may not be equipped with a proper browser to access and view multimedia files available on various Web sites on the Internet. For ease of sharing multimedia files of various formats and enhanced accessibility, there is a need for streamlining the delivery process of multimedia files for mobile users.

SUMMARY

A method and system for sending video content to a mobile device is described. An apparatus and method for sending video content to a mobile device is described. According to one embodiment, a computer-implemented method comprising embedding a widget in a website, the widget generating a form. The form is provided when a user visits the website so as to execute the widget. The form includes a first field to enter a recipient phone number, a send selector, and one or more non-visible fields, the non-visible fields containing a content service provider identifier, and a video URL. A data packet is generated with the widget when the user selects the send selector, the data packet including the recipient phone number, the video URL, and the content service provider identifier. An encoded version of the data packet is sent to the content service provider and a video link message is sent to the recipient phone number.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 3 illustrates exemplary STM result messages, according to one embodiment.

Figure 1:
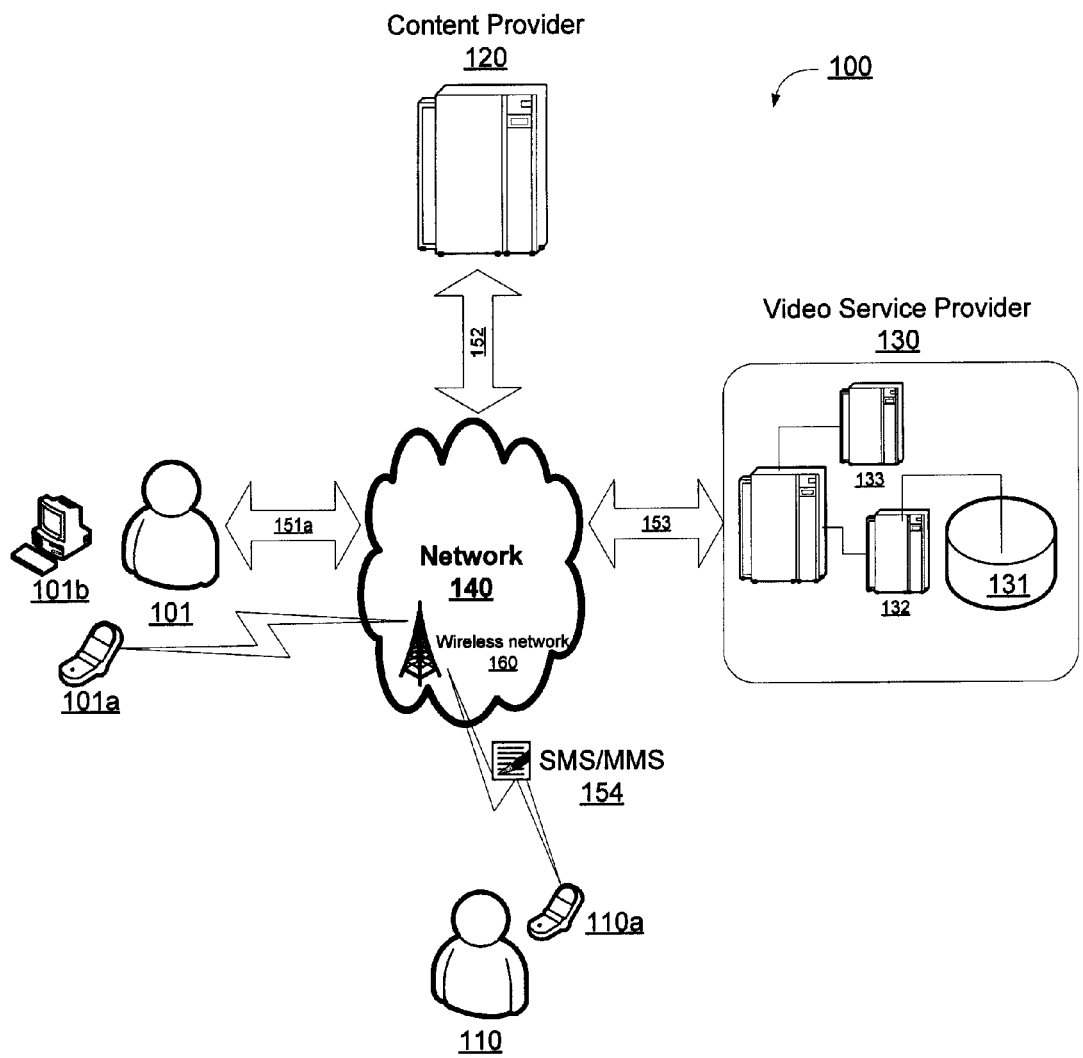
FIG. 1 is a block diagram of an exemplary send-to-mobile (STM) system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

An apparatus and method for dynamically providing web-based multimedia to a mobile phone are described. An apparatus and method for sending video content to a mobile device is described. According to one embodiment, a computer-implemented method comprising embedding a widget in a website, the widget generating a form. The form is provided when a user visits the website so as to execute the widget. The form includes a first field to enter a recipient phone number, a send selector, and one or more non-visible fields, the non-visible fields containing a content service provider identifier, and a video URL. A data packet is generated with the widget when the user selects the send selector, the data packet including the recipient phone number, the video URL, and the content service provider identifier. An encoded version of the data packet is sent to the content service provider and a video link message is sent to the recipient phone number.

Each of the features and teachings disclosed herein can be utilized separately or in conjunction with other features and teachings to provide a method and system for sending a video content to a mobile device. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 is a block diagram of an exemplary send-to-mobile (STM) system, according to one embodiment. STM system 100 includes a user 101, a friend 110, a content provider 120 and a video service provider 130. Communications between user 101, content provider 120 and video service provider 130 are sent via network 140 while friend 110 is reachable via a wireless network 160. According to one embodiment, a user 101 views a video clip at the content provider 120's website using his or her mobile phone (101*a*) or PC (101*b*). The STM system 100 allows the user 101 to share the video clip with a friend 110 by sending a text message (e.g., an SMS (short message service) or an MMS (multimedia messaging service) message). The SMS/MMS message is created at user 101's request by the video service provider 130. The SMS/MMS message is sent to a phone number that provided by user 101. The SMS/MMS message includes a link to the video clip. The friend 110 receives the text message with a uniform resource locator (URL) link and clicks on the URL link to view the video clip on his/her mobile phone 110*a* using a WAP, GPRS, or WiFi connection to the Internet.

According to one embodiment, network 140 is a high-speed broadband network, a Public Switched Telephony Network (PSTN), a Local Area Network (LAN), a Wide Area Network (WAN), an Integrated Services Digital Network (ISDN) or any other type of network that enables two or more devices to exchange information. Furthermore, network 140 may be in whole or in part a Wireless Area Network (WAN), such that user 101 and friend 110 may use wireless devices, cellular phones, PDAs, or any other type of wireless communication devices.

Switching may occur from one network to another within network 140, but is not exhaustively explained for simplicity. For example, if user 101 views a video clip on content provider 120's website on his or her mobile phone 101*a*, the wireless network of user 101's mobile service carrier delivers communication packets to and from user 101 and routes them to a wired network that is connected to the Internet that connects to the content provider 120's Web server.

In one embodiment, there is more than one friend 110 to whom user 101 sends requests to share a video clip via video service provider 130. In another embodiment, user 101 may send a request to himself/herself for viewing or sharing the video clip later on his/her mobile phone 101*a*. In this case, user 101 and friend 110 are the same person. It is noted that user 101 and friend 110 are represented as individual network entities who benefit from the STM system 100. According to another embodiment, user 101 may at one time use PC 101*b* to send a STM request and later use mobile phone 101*a* to view the video clip. User 101 or friend 110 may subscribe the STM service provided by content provider 120. In this case, when new video content is available, additional STM messages are sent to the subscribers to notify the arrival of the new video content.

Video service provider 130 is equipped with a database 131 and a file server 132 to store and manage numerous video clips. Database 131 may be of any type, for example, a relational database, a distributed file system, a Redundant Array of Independent Drive (RAID), a Network Attached Storage (NAS), or a storage devices. Database 131 may also refer to the contents or files available on the Internet or network 140.

Fileserver 132 may be a file server or any file storage devices; for example, a distributed file system, Redundant Array of Independent Drives (RAIDs), a Network Attached Storage (NAS), or any other type of storage devices.

In one embodiment, video service provider 130 is equipped with messaging server 133 for sending text messages to friend 110. The text messaging system may be a native media messaging system such as SMS and MMS, or a carrier-provided transport mechanism such as "Picture Mail."

Content provider 120 provides a Web service for viewing video content. Content provider 120 provides a video-viewing experience along with other value-added services to users. Content provider 120, however, may only support a limited number of video formats. Sometimes, certain video formats require a particular video content player having a particular decoder in order to play the video clips. If the video clips are encoded with a video format that the user's mobile phone does not support, the user may not be able to view the video clips or will need to download a player that supports the video format. This is particularly troublesome for mobile users when his/her mobile phone is equipped with only a default browser that does not support a particular video format or does not allow for easy software upgrades To provide the STM service to users, content provider 120 first embeds a software widget called "STM initiator" in content provider 120's website. The STM initiator may be obtained preconfigured via a self-service registration system on video service provider 130's website or via professional services from video service provider 130. Alternatively, the STM initiator may be obtained unconfigured as a simple piece of embeddable code, which content provider 120 may configure internally. When user 101 selects a video clip on the content provider 120's website to share with friend 110, the STM initiator collects information about the video clip and forwards that information to the video service provider 130. The STM initiator allows user 101 to initiate the exchange of data between content provider 120 and video service provider 130. The STM initiator also collects, packages data and transfers the packaged data therebetween. The STM initiator is configured to include an identification of the content provider 120 and the location of the video clip, etc. The accessibility of the video clip is controlled by content provider 120 based on the agreement between content provider 120 and video service provider 130.

The STM initiator also provides a user interface to user 101 when a request to share the video clip is submitted. When the request is sent from a Web page on content provider 120, video service provider 130 identifies the location of the video clip as the STM initiator forwards information used to locate the video clip. According to one embodiment, the STM initiator forwards a simple URL including parameters to locate the video clip on content provider 120's Web server.

In one embodiment, the STM initiator is configured via a self-service Web interface on video service provider 130's website. In another embodiment, the STM initiator is manually configured by the content provider or video service provider 130, or automatically configured by a script program or a software application. For a content provider 120 that has numerous video clips created by its users, the automatic configuration is a preferred way of configuration for implementing the STM initiators in numerous user-created Web pages.

Once successfully embedded into a Web page containing a video clip on a content provider 120's Web page, the STM initiator creates a link or a selectable object to forward the request of user 101. For example, a clickable button with the words, "send to mobile" is created on the Web page below the embedded video clip. Alternatively, a clickable menu pops up when clicking on the right mouse button while hovering the mouse cursor over the video clip. These linking or selectable objects may include a URL, a graphical data object such as a JPEG or an embedded SWF file. It is understood that many other forms or objects may be considered to implement the STM initiator without deviating from the scope of the present invention.

When user 101 clicks on the "send to mobile" button, a data packet that includes the information about the video clip is transmitted to the video service provider 130 in a particular format, for example, as an HTTP post request. The video clip is then downloaded by video service provider 130 using the protocol and method configured into the STM initiator. In one embodiment, the video clip is downloaded from content provider 120 to video service provider 130 via HTTP using a URL transmitted by the STM initiator. The video clip may be encoded in the content provider 120's preferred video format. In one embodiment, the video format may not be supported or may not be preferred by video service provider 130. In such cases, a format conversion may occur within video service provider 130 to convert the received data packet to a different format. No knowledge of the content provider 120's video format is required. After receiving the fully configured data packet, i.e. the data packet containing both the friend's phone number and the identity of the video clip, video service provider 130 aggregates the information to take the next course of actions to further the delivery of the video clip to the designated friend 110.

Figure 2:
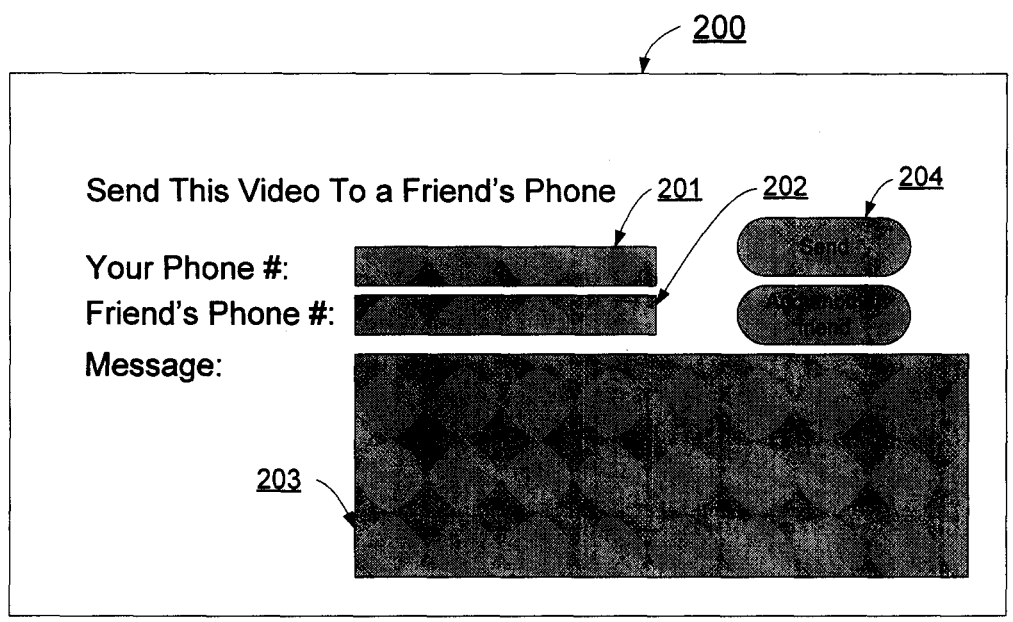
FIG. 2 illustrates an exemplary STM information entry form, according to one embodiment.

FIG. 2 illustrates an exemplary STM information entry form, according to one embodiment. Before or after user 101 clicks on the "send to mobile" button 204, user 101 is prompted with STM information entry form 200 to fill in information for using the STM service. STM information entry form 200 gathers the information about a sender (i.e. user 101) and a recipient (i.e. friend 110) such as the sender's phone number (201), the recipient's phone number (202) and an optional message (203). STM information entry form 200 may be customized to include additional information such as rating classification (e.g., PG13 or R) or the license information of the video clip. The STM information entry form 200 may be further customized to include a check box allowing the user to subscribe to content provider 120's service. In this case, the recipient's phone number 202 will receive additional text messages as new content becomes available on content provider 120's website. The recipient's phone number 202 is used to send a text message 154 including the optional message 203. The STM initiator may further add non-visible fields to the entry form 200 to identify the content provider 120 via its partner code, according to one embodiment.

After completing the STM information entry form 200, user 101 clicks on the "send" button 204 to complete the STM request. The user's "send" action creates a data packet including the sender's and recipient's phone numbers as provided in the STM information entry form 200 and the data packet is transmitted to video service provider 130. The data packet is supplemented with the information about the video clip and the partner code that is already gathered by the STM initiator. According to one embodiment, the information containing the sender's and recipient's phone numbers and the information about the video clip might arrive at video service provider 130 in separate data packets at different time. In such cases, video service provider 130 associates the two data packets to create a single STM request.

The successfully submission of the user's STM request is confirmed by one or more STM result messages that are sent to the user from video service provider 130. The STM result messages affirm the sender's "send to mobile" action, and notify that the video clip is available on video service provider 130's website and that a mobile message containing a link to the video clip will be sent to the designated recipient.

FIG. 3 illustrates exemplary STM result messages, according to one embodiment. According to one embodiment, user 101 receives three STM result messages after submitting an STM request. Message 301 is sent to user 101 when user 101 uses the STM service for the first time. User 101 conveniently locates a video clip on a content provider 120's Web site but does not know that such a service is provided by video service provider 130 since the STM initiator is embedded in the content provider 120's Web site. For the same reason, user 101 does not have to go visit the video service provider 130's Web site for instructions to use the STM service. The STM service is provided interactively with intuitive steps, so that users are not required to have specific knowledge about text messaging, video formats or video players. After the first use of the STM service, user 101 receives a welcoming message 301 from video service provider 130. Friend 110 also receives a welcoming message 301 when accessing a video clip from a received text message from video service provider 130 for the first time.

Message 302 informs user 101 that a new channel (e.g. chanX4081234567) is created to link the video clip that user 101 provided. The channel is used either by user 101 and friend 110 for viewing the video clip. Later, the channel may be used to contain links to more video clips if user 101 or friend 110 adds those video clips to the original video clip that they already shared on the channel. In one embodiment, video clips stored on a channel might be collected from more than one content providers 120.

Message 303 is provided to user 101 or friend 110 to provide a link to the video clip for viewing on their mobile phones 101*a* or 110*a*. The third message 303 may include an optional link to download content other than the video clip such as a mobile application, an advertisement or a video player.

STM partner interface is a Web service provided by video service provider 130 to content provider 120 including the STM information entry form 200 shown in FIG. 2. The information supplied in the STM information entry form 200 is encoded and forwarded to video service provider 130 when user 101 clicks the "send" button 204. The received information on video service provider 130 is then decoded, and the data required to process the STM request is extracted: a partner code, the URL for the requested video clip, sender's and recipient's phone numbers and the optional message that user 101 may have provided in the STM information entry form 200.

According to one embodiment, the STM partner interface determines the mobile service provider for each phone number provided in the STM information entry form 200. The mobile service provider may be found by looking up an internal database containing phone number and mobile phone carrier pairs, by looking up an external phone number database, or from a phone number/carrier matching service. The phone number/carrier matching service hosts a database for mobile service providers and their subscriber's phone numbers and provides an interface to find a matching mobile service provider for a given phone number.

According to one embodiment, the STM partner interface identifies a phone number and further determines the manufacturer and the model of the mobile phone. The information may be provided by the mobile service provider or available to video service provider 130 while searching for the mobile service provider using a phone number. The additional information about the mobile phone is helpful in identifying the software version of the mobile phone.

After all the information required to locate the video clip and the recipient's phone number, the STM partner interface sends a request to download the video clip indicated by the URL. If the video clip has previously been downloaded or is already available on database 131, a stored copy is used instead. An advanced searching process may be adapted to perform a database search based on multiple parameters such as the title, the size, the author and the playing time of the video clip. A duplicate copy or a slight variation of the video clip may be deleted to save storage space in database 131. When downloading the video clip from content provider 120, video service provider 130 may receive an additional custom message from content provider 120. For example, if content provider 120 rewards video service provider 130 financially based on the number of STM requests, i.e. each request is counted for a fee basis, the counter data might be additionally provided along with the time and date, and the IP address of the sender if the sender is sending the request from a PC.

During the download or after the download but before storing onto database 131, the video clip may be transcoded to an appropriate format adequate for viewing on mobile phones. The transcoding may involve compression, resizing, watermarking or any other digital data processing for optimal streaming, maintenance, and transportability.

Video service provider 130 creates accounts for each phone number provided in the STM information entry form 200. These accounts store phone numbers and mobile phone carrier information, and may be used later as login credentials to use the STM service.

Video service provider 130 may further use the partner code to provide custom messages configured uniquely by content provider 120 to serve its users. Any other partner-based customization may be done together at this step such as inserting an advertisement clip to the requested video clip.

The STM text messaging system is responsible for sending text messages to user 101 and friends 110 on their mobile phones 101a and 110a. According to one embodiment, the text messages contain a URL link for viewing the video clip. When user 101 or friend 110 clicks the URL link, the mobile phone's default browser is launched and the video clip indicated by the URL is automatically downloaded or streamed. User 101 or friend 110 may be given an option to download or stream depending on the current connection bandwidth, mobile device capabilities and/or the mobile service network. An additional optional message may be sent containing login and account information created by video service provider 130. In one embodiment, an advertisement or product information may be also sent if users agree to receive them. In another embodiment, users receive or view the advertisement or product information in order to subscribe to the STM service at a subsidized fee or at no cost.

Video service provider 130 provides a video viewing experience to mobile phone users. In one embodiment, an individual video clip stored in video service provider 130 is referenced by a unique URL. In another embodiment, one or more video clips are grouped together and available on a channel referenced by a unique URL. If a channel is referenced by a URL, the URL may be linked by default to the latest video clip uploaded to the channel. The owner of the channel—typically the user who created the channel for the first time—may authorize other users to have an access right and upload more video clips to the channel. The URL may direct to a list of video clips, sorted and archived by the owner's preference, such that the users can select a video clip for viewing from the list. After receiving a text message with a URL and clicking on the URL link, a user initiate communication with video service provider 130 via the mobile carrier's wireless network. Upon receiving the URL request, video service provider 130 allows the user to download or stream the video clip or a group of video clips associated with the URL.

Figure 4:
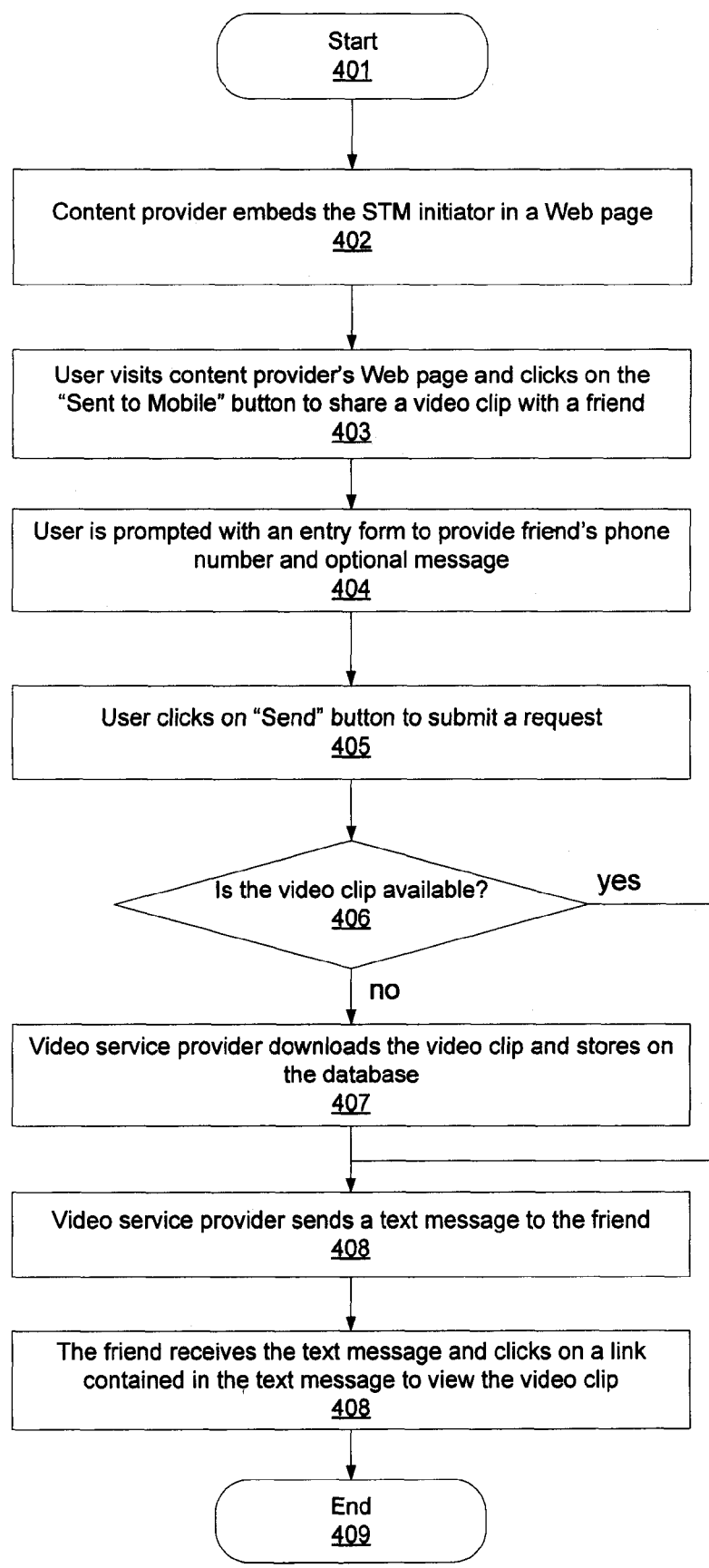
FIG. 4 illustrates an exemplary process for providing a STM service, according to one embodiment.

FIG. 4 illustrates an exemplary process for providing an STM service, according to one embodiment. Content provider 120 embeds the STM initiator into a Web page according to and in compliance with the agreement with video service provider 130 (402). A user visiting the content provider 120's Web page finds a video clip and wants to share it with a friend (403). The embedded STM initiator provides a "send to mobile" button to initiate a request to use the STM service. Thereafter, the user is prompted by a Web-based entry form to provide information including his/her phone number and the friend's phone number along with an optional message to send to the friend and other configurable option, such as willingness to receive advertising or subscribe to additional content (404). The user completes the entry form and clicks on the "send" button in the entry form to submit the STM request (405). Upon receiving the STM request, the video service provider 130 checks if the requested video clip is available on its database 131 (406). If the video clip is not available, the video clip is downloaded, transcoded and stored on the database 131 (407). Thereafter, video service provider 130 sends a text message to the friend's phone number including a URL link to the video clip (408). The friend clicks on the URL and views the video clip originally requested by the user.

An apparatus and method for dynamic streaming or downloading of multimedia files has been described with respect to specific example and subsystems. It will be apparent to those of ordinary skill in the art that it is not limited to these specific examples or subsystems but extends to other embodiments as well.

We claim:

1. A computer-implemented method comprising:
   embedding a widget in a website, the widget configured to generate a form;
   providing the form when a user visits the website so as to execute the widget, the form comprising a first field to enter a recipient phone number, a send selector, and one or more non-visible fields, the non-visible fields containing a content service provider identifier, and a video URL;
   generating a data packet with the widget when the user selects the send selector, the data packet comprising the recipient phone number, the video URL, and the content service provider identifier;

sending an encoded version of the data packet to the content service provider;
immediately downloading a video related to the video URL when the video is not stored in a database of the content service provider;
transcoding the video into a format adequate for viewing on mobile devices; and
sending a plurality of text messages to the recipient phone number, the plurality of text messages comprising a first time user message, a new channel creation message, and the video link message.

2. The computer-implemented method of claim 1, wherein the form further comprises a sender phone number, a send button, a message field, a content discretion rating field, content license information, and a subscribe to sender selector.

3. The computer-implemented method of claim 1, further comprising: sending a confirmation text message to a sender phone number upon receipt of the encoded version of the data packet.

4. The computer-implemented method of claim 1, wherein the video link message contains the video URL of a video clip sent by the user.

5. The computer-implemented method of claim 1, wherein upon receipt of the encoded version of the data packet, the method further comprises: determining a mobile phone carrier servicing the recipient phone number.

6. The computer-implemented method of claim 1, wherein upon receipt of the encoded version of the data packet, the method further comprises: determining a manufacturer and a model number of a mobile phone associated with the recipient phone number.

7. The computer-implemented method of claim 1, wherein upon receipt of the encoded version of the data packet, the method further comprises: determining a version of operating system software of a mobile phone associated with the recipient phone number.

8. The computer-implemented method of claim 1, further comprising:
receiving a request to retrieve the video URL, wherein the request is received at the content service provider from a recipient phone associated with the recipient phone number; and
providing a video clip associated with the video URL from a cached location when the cached location stores the video clip.

9. A non-transitory computer-readable medium having stored thereon a plurality of instructions, said plurality of instructions, when executed by a computer, configured to cause the computer to:
embed a widget in a website, the widget configured to generate a form;
provide the form when a user visits the website so as to execute the widget, the form comprising a first field to enter a recipient phone number, a send selector, and one or more non-visible fields, the non-visible fields containing a content service provider identifier, and a video URL;
generate a data packet with the widget when the user selects the send selector, the data packet comprising the recipient phone number, the video URL, and the content service provider identifier;
send an encoded version of the data packet to the content service provider;
immediately download, transcode, and store a video related to the video URL when the video is not stored in a database of the content service provider;
transcode the video into a format adequate for viewing on mobile devices; and
send a plurality of text messages to the recipient phone number, the plurality of text messages comprising a first time user message, a new channel creation message, and the video link message.

10. The non-transitory computer-readable medium of claim 9, wherein the form further comprises a sender phone number, a send button, a message field, a content discretion rating field, content license information, and a subscribe to sender selector.

11. The non-transitory computer-readable medium of claim 9, having stored thereon additional instructions, the additional instructions, when executed by the computer, configured to cause the computer to send a confirmation text message to a sender phone number upon receipt of the encoded version of the data packet.

12. The non-transitory computer-readable medium of claim 9, wherein the video link message contains the video URL of a video clip sent by the user.

13. The non-transitory computer-readable medium of claim 9, having stored thereon additional instructions, the additional instructions, when executed by the computer, configured to cause the computer to determine a mobile phone carrier servicing the recipient phone number upon receipt of the encoded version of the data packet.

14. The non-transitory computer-readable medium of claim 9, having stored thereon additional instructions, the additional instructions, when executed by the computer, configured to cause the computer to determine a manufacturer and a model number of a mobile phone associated with the recipient phone number upon receipt of the encoded version of the data packet.

15. The non-transitory computer-readable medium of claim 9, having stored thereon additional instructions, the additional instructions, when executed by the computer, configured to cause the computer to determine a version of operating system software of a mobile phone associated with the recipient phone number upon receipt of the encoded version of the data packet.

16. The non-transitory computer-readable medium of claim 9, having stored thereon additional instructions, the additional instructions, when executed by the computer, configured to cause the computer to:
receiving a request to retrieve the video URL, the request received at the content service provider from a recipient phone associated with the recipient phone number; and
providing a video clip associated with the video URL from a cached location if the cached location stores the video clip.

* * * * *